United States Patent [19]

Ugelstad et al.

[11] Patent Number: 4,530,956

[45] Date of Patent: Jul. 23, 1985

[54] PROCESS FOR THE PREPARATION OF AQUEOUS DISPERSIONS OF ORGANIC MATERIAL AND POSSIBLE FURTHER CONVERSION TO A POLYMER DISPERSION WHEN THE ORGANIC MATERIAL IS A POLYMERIZABLE MONOMER

[75] Inventors: John Ugelstad; Arvid Berge, both of Trondheim, Norway

[73] Assignee: Sintef, Trondheim NTH, Norway

[21] Appl. No.: 509,464

[22] PCT Filed: Oct. 19, 1982

[86] PCT No.: PCT/NO82/00052

§ 371 Date: Jun. 7, 1983

§ 102(e) Date: Jun. 7, 1983

[87] PCT Pub. No.: WO83/01453

PCT Pub. Date: Apr. 28, 1983

[30] Foreign Application Priority Data

Oct. 21, 1981 [NO] Norway ................................ 813547

[51] Int. Cl.$^3$ ............................................. C08F 2/16
[52] U.S. Cl. .................................. 524/458; 524/460; 526/80; 526/87
[58] Field of Search ................... 526/80, 87; 524/458, 524/460

[56] References Cited

U.S. PATENT DOCUMENTS

| | | | |
|---|---|---|---|
| 3,485,808 | 12/1969 | Wiesner | 526/80 |
| 4,113,687 | 9/1978 | Ugelstad | 524/794 |
| 4,186,120 | 1/1980 | Ugelstad | 524/458 |
| 4,254,004 | 3/1981 | Abbey | 526/80 |
| 4,272,426 | 6/1981 | Feast | 526/80 |
| 4,328,149 | 5/1982 | Morse | 524/460 |
| 4,336,173 | 6/1982 | Ugelstad | 523/205 |
| 4,409,355 | 10/1983 | Heimberg | 526/80 |

*Primary Examiner*—Paul R. Michl
*Attorney, Agent, or Firm*—Wenderoth, Lind & Ponack

[57] ABSTRACT

Process for preparing aqueous dispersions of a somewhat water-soluble low-molecular organic material, in which swellable particles prepared in a first step are swelled with the organic material in the second step. When the organic material is a polymerizable monomer the dispersion prepared is converted to a polymer dispersion. In the first step swellable oligomer or oligomer-polymer particles are prepared by (a) dispersing an aqueous mixture containing an oil-soluble initiator or a solution of an oil soluble initiator in an organic solvent, and then swelling the dispersed initiator-containing droplets with monomer and effecting polymerization, or (b) swelling polymer particles in aqueous dispersion with vinyl monomer and an oil-soluble initiator and effecting polymerization, the ratio between initiator and monomer used being so high that in the polymerization an oligomer having a degree of polymerization of 5–200 is formed. In the second step, optionally after dilution with water and addition of emulsifier, the organic material is added which has a solubility in water of >10, preferably >100 times higher than that of the oligomer and which diffuses through the aqueous phase and swells the oligomer or oligomer-polymer particles in a ratio by volume of >20:1. When the organic material is a polymerizable monomer, initiator is also added in the second step, and polymerization is effected.

10 Claims, No Drawings

PROCESS FOR THE PREPARATION OF AQUEOUS DISPERSIONS OF ORGANIC MATERIAL AND POSSIBLE FURTHER CONVERSION TO A POLYMER DISPERSION WHEN THE ORGANIC MATERIAL IS A POLYMERIZABLE MONOMER

The present invention relates to a new process for preparing oligomer and/or oligomer-polymer particles and the use of these for the preparation of polymer dispersions and, if desired, dispersions with monodisperse polymer particles.

The preparation in aqueous dispersion or in a mixture of water and organic solvents of particles which are capable of absorbing much more of low molecular substances than ordinary polymer particles, has been described in previous patents.

In Norwegian Pat. No. 142.082 there is described a process which comprises the preparation of particles which are characterized in that they are capable of taking up large amounts of low molecular substance, such as a monomer. In a special process this is attained by adding to a dispersion of polymer particles in water, a liquid Substance I having a very low solubility in water, or a solution of the same which in advance has been homogenized to become rapidly absorbed in the polymer particles. In order to further increase the rate of absorption, a water soluble solvent for Substance I, such as acetone, is added in certain cases. The amount of Substance I which may be absorbed in the initial polymer particles, is in practice limited to about 10 times the volume of polymer, for large particles somewhat more. For small particles the limit is normally 2–3 times. The obtained particles which contain polymer + said Substance I having a very low solubility in water, are capable of absorbing more than a 1000 times its own volume of a more water soluble Substance II, depending on the size of the particles. It is emphasized that an essential feature for this swelling capacity, is that the conditions during the swelling with Substance II are such that the only transport which can take place, is the transport of Substance II through the outer phase into the particles, while the transport of said Substance I having a very low water solubility out of the particles, is hindered. A condition for this is that the difference in solubility in the outer phase between Substance II and I is a factor of >10, preferably >100. It is emphasized that in the use of solvents to increase the diffusion of Substance I into the particles, it is later necessary to prevent the diffusion out of the particles either by removing the solvent added in the first step or dilution with water before addition of Substance II.

Norwegian Pat. No. 141.367 describes a method for preparing swellable particles by preparing an oligomer by means of a chain transfer agent. By adjusting the amount of chain transfer agent and using it in amounts far above those which are commonly used in processes in which chain transfer agents are employed, it is possible to obtain particles which exclusively or predominantly contain oligomer of a molecular weight <5000. The weakness of this method is that it is necessary to use relatively large amounts of chain transfer agent with a chain transfer constant equal to the rate constant for the growth of the growing radical. This is a condition for obtaining a constant ratio between the concentration of monomer and the concentration of chain transfer agent during the polymerization, in order to ensure that the mean degree of polymerization in the oligomers formed, is constant. If the transfer constant is higher than the growth constant, the chain transfer agent will be rapidly consumed and the molecular weight will increase. If the transfer constant is lower than the growth constant, there will be a considerable amount of chain transfer agent left after all the monomer has reacted, and the molecular weight of the oligomers will decrease markedly as the monomer is consumed.

According to the present invention there is provided a process in which particles which exclusively or predominantly consist of oligomer having a desired and relatively constant molecular weight, are prepared in a first step by providing a high ratio between the rate of radical formation and the rate of polymerization. Particles which have been prepared in this manner, and which contain oligomer having a molecular weight <20000, preferably <5000, exhibit a much higher capacity for absorbing other relatively low molecular substances than the capacity of particles of pure polymer.

The degree of polymerization of an oligomer will be determined by the ratio between the rate of growth of the growing radical and the rate of formation of radicals. The degree of polymerization is accordingly determined by the molar ratio between monomer and initiator and by the type of monomer and initiator used. In order for the oligomer to attain the desired degree of polymerization of less than 200, corresponding to a molecular weight of 10000 to 20000, preferably less than 50, corresponding to a molecular weight of 2500 to 5000, it is usually necessary with a molar ratio between monomer and initiator of 0.25:1 to 50:1. It is desired to keep the degree of polymerization above 5. The reason why a low and relatively constant molecular weight is attained, is that the rate of polymerization is low compared with the rate of radical formation.

In an embodiment of the new process monomer and initiator are added in the proper molar ratio to an aqueous dispersion of polymer particles, and by polymerization oligomer-polymer particles are formed. In the preparation of oligomer-polymer particles any type of oil-soluble initiator may be used. Examples of such are azo-bis-isobutyric nitrile, 2,2'-azo-bis(2,4-dimethyl-valeronitrile) and benzoyl peroxide, dioctanoyl peroxide, didecanoyl peroxide and tert.butyl-peroxy-2-ethylhexanoate.

With some of these initiators such as azo-isobutyric nitrile, 2,2'-azo-bis(2,4-dimethyl-valeronitrile) and benzoyl peroxide, it is possible to add the initiator to a dispersion of the polymer particles after the latter have been swollen with monomer. With these initiators it is also possible to swell the particles with a mixture of monomer and initiator at a low temperature and after swelling of the particles raise the temperature, whereby polymerization takes place with formation of oligomer.

In case there is used an oil-soluble initiator which has a very low solubility in water, such as dioctanoyl peroxide, the polymer particles in aqueous dispersion are swollen, optionally under addition of solvent, with the oil-soluble initiator in a volume ratio between initiator and polymer of 0.25:1 to 20:1. Then there is added a vinyl monomer or a mixture of vinyl monomers which is absorbed in the particles swollen with initiator. Upon polymerization oligomer will then be formed. As an example, in polystyrene particles having a particle diameter of 0.5 $\mu$m as a dispersion in water, one may first add an amount of initiator, such as dioctanoyl peroxide, in a ratio by volume to the polymer particles of 3:1. After the addition of initiator, there is added extra water and monomer in a molar ratio of for instance 5:1 based on the initiator. After the addition of monomer the temperature is raised, and polymerization is carried out at about 70° C. About 70 percent of the particles formed consist of oligomer having a mean degree of polymerization of about 25 and they have a diameter of about 1 $\mu$m.

A corresponding process with seed of polystyrene particles having a diameter of 5 and 10 $\mu$m respectively will after the above cycle yield particles containing 70 percent of oligomer having a mean degree of polymerization of 25 and a diameter of 10 and 20 $\mu$m respectively. In case an initiator having a very low solubility in water is used, it is advantageous to finely divide the initiator or a solution thereof so that it is added in the form of a fine dispersion. It may further be necessary to use an addition of a solvent which is miscible with water in order to increase the rate of absorption of the initiator having a very low solubility in water into the particles. In order to increase the rate of splitting of the initiator in the formation of oligomer, it is possible to use an addition of reducing agents such as amines, ascorbic acid, optionally together with trace metals.

To dispersions of these oligomer-polymer particles there are added in the second step low molecular weight organic materials which are somewhat water soluble and which will diffuse through the outer phase to become absorbed in the oligomer-polymer particles under conditions where the only possible transport is a transport of the low molecular weight substance through the outer phase to the particles. Examples of low molecular weight organic materials are aliphatic and cyclic alkanes having not more than 10 C-atoms, aromatic compounds such as benzene or esters such as ethyl acetate, these being substituted if desired. The organic material may for instance be a monomer which is polymerized after absorption in the oligomer-polymer particles. It should have a water solubility of at least $10^{-5}$ g/l. The oligomer-polymer particles will under these conditions be capable of absorbing more than a 1000 times their own volume of the low molecular substance depending on the particle size (higher relative take up with larger particles) and emulsifier (higher take up with lower interfacial surface tension between particle and water).

As a comparison a pure polymer particle will only be capable of absorbing 2–20 times its own volume of low molecular weight substance. Similarly, the rate of absorption of low molecular weight substance will be much higher in an oligomer-polymer particle than in a corresponding particle containing pure polymer.

As monomer in the preparation of the oligomer-polymer particles it is possible to use ordinary vinylmonomers or mixtures thereof. Examples of monomers which may be used, are styrene, acrylates such as methacrylate and methyl methacrylate, and vinyl acetate. Often it may be advantageous to use a mixture of monomers. Examples of such are styrene-butadiene and styrene-$\alpha$-methyl-styrene. Particularly in the last case it is very easy to adjust the degree of polymerization of the oligomer by varying the relative amount of styrene and $\alpha$-methyl-styrene, since increasing relative amount of $\alpha$-methyl-styrene will result in a lower degree of polymerization.

In case the low molecular weight substance added to the oligomer-polymer particles is a vinyl monomer, it may after absorption be polymerized in a usual manner by means of preferably oil-soluble initiators. The monomer used in this step does not have to be the same as the one which has been used in the original seed or the one which has been used for the preparation of the oligomer. Examples of monomers which may be used are styrene, methylacrylate, methylmethacrylate, butylacrylate, vinylacetate, vinyl chloride, butadiene. It will be obvious that at any stage it is also possible to use a mixture of different vinyl monomers.

Examples of oil-soluble initiators which may be used, are azo-bis-isobutyric nitrile, 2,2'-azo-bis(2,4-dimethyl-valeronitrile), benzoyl peroxide, dioctanoyl peroxide.

As in the preparation of the oligomer-polymer particles the initiator may be added before, together with or after the monomer.

The most suitable method is also in this case determined by the type of oil-soluble initiator. Initiators which may be added after or together with the monomer, are for instance azo-bis-isobutyric nitrile and benzoyl peroxide. In one case it is possible first to swell the oligomer-polymer particles with monomer and then add initiator after the monomer has been absorbed. Further, with these initiators it is possible to add a mixture of monomer and initiator to the dispersion of oligomer-polymer particles in one step at a low temperature. After swelling of the oligomer-polymer particles the temperature is raised, leading to polymerization of the vinyl monomer.

As described above the oligomer-polymer particles may absorb up to more than a 1000 times their own volume of a mixture of monomer and initiator.

With initiators having a very low solubility in water, such as dioctanoyl peroxide, didecanoyl peroxide and tert.butyl-peroxy-2-ethylhexanoate it is advantageous to add these before the monomer.

In view of the fact that the oligomer-polymer particles prepared as described above primarily consist of oligomer having a relatively low molecular weight, but nevertheless so high that the solubility of the oligomer in mixtures of water and water soluble organic solvents is very low, it is possible to carry out a rapid swelling of these particles with relatively large amounts of an initiator having a very low solubility in water, such as dioctanoyl peroxide. The fact that the oligomer present in the particles is much more insoluble in mixtures of water and organic solvents than is dioctanoyl peroxide, entails that it will be possible to use a relatively high content of for instance acetone in order to incorporate the dioctanoyl peroxide. This and the above fact that there is a substantial amount of oligomer in the particles, lead to the surprising result that in particles having a diameter of 1 $\mu$m it is possible to incorporate 10–200 times of for instance dioctanoyl peroxide based on the volume of the oligomer-polymer particles. After the incorporation of dioctanoyl peroxide there is usually added water and optionally emulsifier, and monomer is added, for instance in an amount of about 30 to 1000 times the volume of dioctanoyl peroxide under conditions where the dioctanoyl peroxide does not diffuse out of the particles. This may for instance be attained by dilution with water. If for instance dioctanoyl peroxide has been incorporated as initiator in the oligomer-polymer particles in an amount of 80 times the volume of the oligomer-polymer particles, and monomer in an amount (by volume) of a 100 times that of the initiator incorporated in the particles, the result will be that after polymerization there has been prepared particles having a diameter of about 20 μm directly from particles of 1 μm in a simple two step process, i.e. an increase of particle volume of 8000 times.

The two step method from seed particles described above is particularly suitable for the preparation of monodisperse particles of varying sizes. In this case one starts with a seed of monodisperse polymer particles which are swelled with initiator and monomer, and prepares monodisperse oligomer-polymer particles which are further used for the preparation of monodisperse polymer particles as described above.

As emulsifier in all stages of the process one may use anionic emulsifiers such as sodium dodecyl sulfate, sodium dodecylbenzene sulfonate, cationic emulsifier such as octadecylpyridinium bromide, polymeric emulsifiers such as acrylic graft polymers, non-ionic emulsifiers such as alkylphenoxy-ethylene glycols,

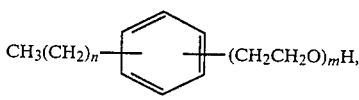

and solid stabilizers such as Ca-phosphate.

As water-soluble solvent used to increase the rate of transport and the swelling of the particles with initiator, one may for instance use ketones such as acetone and methylethylketone, and lower alcohols such as methanol or ethanol. The water soluble solvent is suitably used in an amount of 5–200 percent by volume based on the water in the system.

In a particular embodiment of the present process in which monodisperse particles are not desired, an oil soluble initiator or a solution of an initiator in an organic solvent is mixed with water and emulsifier. A dispersion of the initiator is thereby formed. After the dispersion monomer is added, normally in a molar ratio to the initiator of 0.25:1 to 50:1 and polymerization is carried out. This oligomer seed will be capable of absorbing more than 20 and up to more than 1000 times its own volume of low molecular substances and may be employed in the same manner as stated above. In particular, also in this case it is possible to use the oligomer seed prepared in the first step for the preparation of polymer particles as described above. This may be done as described above by incorporating the monomer together with dissolved initiator, whereafter polymerization is carried out. Similarly, as described above, in the oligomer particles one may incorporate an initiator having a very low solubility in water, i.e. a water solubility of $<10^{-3}$ g/l $H_2O$, in a proportion by volume of 10:1 to 200:1 (based on the volume of the oligomer particles), whereafter dilution is carried out with water to which emulsifier has been added, and then monomer is added in a proportion by volume of 30:1 to 1000:1 based on the initiator in the particles.

In this process it is possible to use the same vinyl monomers and mixture of monomers as described above. Similarly, it is possible to use the same types of emulsifiers and stabilizers. In case it is desired to incorporate an initiator having a very low water solubility in the oligomer particles, it is possible to use the same water soluble solvents as described above.

EXAMPLE 1

30 g of dioctanoyl peroxide, 300 g of $H_2O$ and 0.9 g of Na-lauryl sulfate (NaLS) were finely homogenized. This resulted in an emulsion having a droplet diameter of 0.2–0.3 μm. To this emulsion there was added a monodisperse seed latex (I) of polystyrene having a particle diameter of 0.52 μm. 60 g of seed latex were used containing 50 g of water and 10 g of polystyrene particles. After stirring for 2 days at 25° C. all initiator was inside the particles. The droplet diameter was about 0.8 μm. 200 g of $H_2O$ were added and then 50 g of styrene under ordinary stirring at 25° C. After 2 hours the temperature was raised to 70° C., and polymerization was carried out for 3 hours. The oligomer-polymer particles formed were monodisperse having a particle diameter of 1 μm. The oligomeric moiety of the particles which constituted about 80 percent had a mean degree of polymerization of 28. The solids content was found to be 13 percent.

To 1 g of this oligomer-polymer latex containing 0.13 g particles there were added 30 g of $H_2O$ containing 0.05 g of NaLS and 28 g of chlorobenzene. After stirring for 4 hours all chlorobenzene had been taken up in the particles, corresponding to a volume/volume swelling of about 200 times.

EXAMPLE 2

An experiment was carried out as described in example 1, with the exception that during the preparation of the oligomer-polymer particles acetone was also used. 20 percent of acetone was present in the outer phase during the swelling with dioctanoyl peroxide, and the swelling was then terminated within 5 hours.

EXAMPLE 3

An experiment was carried out as described in example 2, but to the emulsion of dioctanoyl peroxide 60 g of seed latex containing 50 g of $H_2O$ and 10 g of polystyrene particles having a diameter of 2.0 μm (II) were added. After stirring for 1 day at 25° C. all the initiator was ihside the particles. The droplet diameter was then 3.2 μm. 200 g of $H_2O$ were added and then 50 g of styrene with ordinary stirring at 25° C. After 2 hours the temperature was raised to 70° C., and polymerization was carried out for 3 hours. The oligomer-polymer particles formed were monodisperse having a particle diameter of 4 μm.

1 g of this oligomer-polymer latex containing 0.13 g of particles was charged with 120 g of $H_2O$ containing 0.2 g of NaLS and then 115 g of chlorobenzene. After 8 hours all the chlorobenzene had been absorbed, corresponding to a volume/volume swelling of about 800 times.

EXAMPLE 4

60 g of seed latex (II) containing 50 g of $H_2O$, 10 g of polystyrene particles and 0.08 g of NaLS were charged with 100 g of $H_2O$ containing 0.2 g of NaLS and 20 g of styrene. After essentially all the styrene had been absorbed in the particles, 7.5 g of benzoyl peroxide were added. The polymerization was carried out at 85° C. The obtained oligomer constituting about 65 percent of the oligomer-polymer particles had a mean degree of polymerization of 50. The particle diameter was about 3 μm.

EXAMPLE 5

1 g of an oligomer-polymer latex prepared as described in example 1 was charged with 40 g of $H_2O$ containing 0.08 g of NaLS and 10 g of styrene in which 0.1 g of benzoyl peroxide had been dissolved. After stirring for 5 hours the temperature was raised to 80° C., and polymerization was carried out for 8 hours. The particles formed were monodisperse and had a diameter of 4 μm.

EXAMPLE 6

1 g of an oligomer-polymer latex prepared as in example 3 containing 0.13 g of particles having a diameter of 4 μm was charged with 150 g of $H_2O$ containing 0.3 g of NaLS and 17 g of styrene containing 0.17 g of benzoyl peroxide. After stirring for 10 hours the temperature was raised to 85° C., and polymerization was carried out for 6 hours. The polymer particles formed were monodisperse having a particle diameter of 19 μm.

EXAMPLE 7

1 g of the oligomer-polymer latex prepared as described in example 3, containing 0.13 g of particles having a diameter of 4 μm, was charged with 150 g of $H_2O$ containing 0.3 g of NaLS og 15 g of styrene. After stirring until the major part of the styrene had been absorbed in the particles, 0.20 g of benzoyl peroxide were added. The polymerization was carried out at 85° C. and was carried out for 6 hours. The particles formed were monodisperse having a particle diameter of 18 μm.

EXAMPLE 8

1 g of oligomer-polymer latex prepared as described in example 1, containing 0.13 g of particles, was charged with a finely homogenized emulsion of dioctanoyl peroxide, containing 5.2 g of dioctanoyl peroxide, 52 g of $H_2O$ and 0.2 g of NaLS. The proportion by weight of dioctanoyl peroxide relative to oligomer-polymer particles was 40:1. In order to facilitate the transport of dioctanoyl peroxide through the outer phase and into the particles, acetone was used during the process in such an amount that the outer phase contained 20% of acetone and 80% of $H_2O$. The swelling of the particles with dioctanoyl peroxide lasted for 2 days. After this 3000 g of $H_2O$ and 5 g of NaLS were added. Then 400 g of styrene were added. The mixture was stirred for 5 hours at 25° C. The temperature was then raised to 70° C. and polymerization took place for 9 hours. The particles formed were monodisperse having a particle diameter of 14 μm.

EXAMPLE 9

An experiment was carried out as described in example 8, with the exception that during the swelling of 1 g of oligomer-polymer latex, containing 0.13 g of particles, with dioctanoyl peroxide more acetone was used so that the outer phase contained 50% acetone. The time for swelling of the oligomer-polymer particles was then reduced to 15 hours.

EXAMPLE 10

1 g of the oligomer-polymer latex prepared as in example 3, containing 0.13 g of particles having a diameter of 4 μm, was charged with an emulsion of dioctanoyl peroxide of the same type as described in example 8. The emulsion contained 7 g of dioctanoyl peroxide, 70 g of $H_2O$ and 0.34 g of NaLS. In order to facilitate transport of dioctanoyl peroxide through the outer phase and into the particles acetone was used in such an amount that the outer phase contained 40% of acetone and 60% of $H_2O$. The swelling of dioctanoyl peroxide in the particles lasted for 2 days. After this 6000 g of $H_2O$ containing 10 g of NaLS were added. Then 700 g of styrene were added. The mixture was stirred for 6 hours at 25° C. The temperature was then raised to 70° C., and polymerization was carried out for 10 hours. The particles formed were monodisperse having a particle diameter of 65 μm.

EXAMPLE 11

An experiment was carried out as described in example 9, but during the swelling of the final oligomer-polymer particles with dioctanoyl peroxide a weight ratio between dioctanoyl peroxide and oligomer-polymer-particles of 80 was used. To 1.0 g of oligomer-polymer latex, i.e. 0.13 g of particles, 10.4 g of dioctanoyl peroxide were added. Then 7000 g of $H_2O$ and 11.2 g of NaLS were added. 800 g of styrene were added with stirring at 25° C. After 5 hours the temperature was raised to 70° C., and polymerization was carried out for 9 hours. The particles formed were monodisperse having a diameter of 18 μm.

EXAMPLE 12

60 g of a monodisperse seed latex (I) of polystyrene having a particle diameter of 0.52 μm containing 50 g of $H_2O$ and 10 g of polystyrene particles was charged with 300 g of $H_2O$ containing 0.6 g of NaLS, and 20 g of styrene containing 10 g of bis-ortho-methyl-benzoyl peroxide. After stirring for 5 hours at room temperature the temperature was raised to 70° C., and polymerization was carried out for 3 hours. The oligomer-polymer particles formed were monodisperse having a particle diameter of 0.75 μm. The oligomeric moiety of the particles constituted about 65% and had a mean degree of polymerization of 30. The solids content was found to be 10%.

To 1 g of this oligomer-polymer latex containing 0.1 g of particles there were added 30 g of $H_2O$ containing 0.05 g of NaLS and 20 g of chlorobenzen. After 4 hours stirring all chlorobenzen had been taken up by the particles, corresponding to a volume/volume swelling of about 180 times.

EXAMPLE 13

To 1 g of the oligomer-polymer latex prepared as described in example 1, containing 0.13 g of particles, there was added a dispersion of dioctanoyl peroxide of the same type as in example 8. The proportion by weight of dioctanoyl peroxide relative to the oligomer-polymer particles was 35:1, i.e. 4.6 g of dioctanoyl peroxide were added. In order to facilitate the incorporation of initiator in the particles acetone was used so that the outer phase contained 20% of acetone and 80% of $H_2O$. After 2 days the swelling was terminated, and 3100 g of $H_2O$ and 4.0 g of NaLS were added. Then 450 g of methylmethacrylate were added under ordinary stirring at 25° C. After 3 hours the temperature was raised to 70° C., and polymerization was carried out for 8 hours. The particles formed were monodisperse having a particle diameter of 14 μm.

EXAMPLE 14

An homogenized emulsion was made from 20 g of dioctanoyl peroxide, 200 g of $H_2O$ and 0.6 g of NaLS. To this emulsion there was added a monodisperse seed latex (III) of polymethyl-methacrylate having a particle diameter of 0.40 μm. 53 g of seed latex were used containing 10 g of polymethylmethacrylate particles and 43 g of $H_2O$. After stirring for 2 days at 25° C. all the initiator was inside the particles. The droplet diameter was then 0.58 μm. Then 300 g of $H_2O$ and 0.3 g of NaLS were added. 60 g of methylmethacrylate were added under stirring at 25° C. After 2 hours the temperature was raised to 70° C., and polymerization was carried out for 2 hours. The oligomer-polymer particles formed were monodisperse having a particle diameter of 0.83 μm. The oligomeric moiety of the particles had a mean degree of polymerization of 50. The solids content was found to be 13%. To 1 g of this oligomer-polymer latex containing 0.13 g of particles there was added a dispersion of dioctanoyl peroxide of the same type as described in example 8. The proportion by weight of dioctanoyl peroxide relative to the oligomer-polymer particles was 20:1, i.e. 2.6 g of dioctanoyl peroxide were added. In order to facilitate the transport of initiator into the particles acetone was used so that the outer phase contained 20% of acetone and 80% of $H_2O$. After stirring for 30 hours at 25° C. 1800 g of $H_2O$ and 2.9 g of NaLS were added. Then 250 g of methylmethacrylate were added with stirring at 25° C. After 5 hours the temperature was raised to 70° C., and polymerization was carried out for 8 hours. The particles formed were monodisperse having a particle diameter of 10 μm.

EXAMPLE 15

10 g of dioctanoyl peroxide, 0.3 g of NaLS and 100 ml of $H_2O$ were homogenized in a pressure homogenizer, and an emulsion having a mean droplet diameter of 0.25 μm was obtained. After the homogenization the emulsion was transferred to a reactor, and 15 g of styrene were added with ordinary stirring at 25° C. After stirring for half an hour, the temperature was raised to 70° C., and the polymerization was started. Polymerization was carried out for 3 hours, and oligomer particles had then been formed with a degree of polymerization of 30 and a mean particle diameter of 0.35 μm. The oligomer particles formed were then used for further swelling with dioctanoyl peroxide and subsequently with styrene.

There was taken out oligomer latex in such an amount as to contain 0.25 g of oligomer particles. To this latex there was added a homogenized emulsion containing 3.75 g of dioctanoyl peroxide, 0.12 g of NaLS, 37.5 ml of $H_2O$ and 5 ml of acetone. After stirring for 10 hours at 25° C. all the dioctanoyl peroxide had diffused into the oligomer particles. After diffusion of dioctanoyl peroxide $H_2O$ was added to a total volume of a 1000 ml, and 1.8 g of NaLS were also added. Then 250 g of styrene were added with ordinary stirring at 25° C. After stirring the styrene for 5 hours at 25° C. the temperature was raised to 70° C., and the polymerization started. Polymerization was carried out for 9 hours at 70° C. The polymer formed had a mean particle diameter of 3.3 μm and a solids content of 20%.

EXAMPLE 16

A mixture of 40 g of dioctanoyl peroxide in 60 g of styrene were charged with 300 g of $H_2O$ containing 5 g of finely divided tricalcium phosphate and 0.03 g of sodium dodecylbenzenesulfonate. This was stirred with a high speed stirrer of the type Ultraturrax at 5000 rpm for 15 minutes. The dispersed mixture was then allowed to polymerize at 70° C. with ordinary stirring for 3 hours. There was obtained a polydisperse dispersion of spherical particles in the range 5–70 μm. The degree of polymerization in the particles was about 30. By means of sieving about 5 g of particles having a diameter in the range 10–20 μm were separated out. 1 g of particles in the size range 10–20 μm were then suspended in 1000 g of $H_2O$ to which 10 g of tricalcium phosphate and 0.1 g of sodium dodecyl benzene sulfonate had been added. Then 100 g of styrene containing 1 g of benzoyl peroxide were added with ordinary stirring. After stirring for 10 hours the temperature was raised to 80° C., and polymerization was carried out for 8 hours. Spherical particles having a size in the range 35–100 μm were obtained.

We claim:

1. Process for the preparation of aqueous dispersions of somewhat water-soluble, low molecular weight organic material, in which swellable particles prepared in a first step are swelled with the organic material in a second step, and, if desired, the prepared dispersion is converted to a polymer dispersion when the organic material is a polymerizable monomer, and wherein in the first step, oligomer or oligomer-polymer particles are prepared by (a) dispersing an aqueous mixture which contains an oil-soluble initiator or a solution of an oil-soluble initiator in an organic solvent, and then swelling the dispersed initiator-containing drops with monomer and effecting polymerization, or (b) swelling polymer particles in an aqueous dispersion with vinyl monomer and an oil-soluble initiator and effecting polymerization, the ratio between initiator and monomer used being so high that in the polymerization an oligomer having a degree of polymerization of 5–200 is formed, and in the second step, if desired after dilution with water and addition of emulsifier, the organic material is added which has a solubility in water >10, preferably >100 times higher than that of the oligomer, and which diffuses through the aqueous phase and swells the oligomer or oligomer-polymer particles in a ratio by volume of >20:1, and when the organic material is a polymerizable monomer, initiator is also added in the second step, and polymerization is effected.

2. Process according to claim 1, wherein in the first step oligomer-polymer particles are prepared by swelling dispersed polymer particles with initiator and vinyl monomer, wherein the molar ratio between monomer and initiator is 0.25:1 to 50:1, and effecting polymerization.

3. Process according to claim 1, wherein in the first step oligomer-polymer-particles are prepared by first swelling the polymer particles in a dispersion with an initiator having a very low solubility in water in a ratio by volume between initiator and polymer particles of 0.25:1 to 20:1, and then swelling with monomer in a molar ratio of monomer to initiator of 0.25:1 to 50:1, and forming oligomer by polymerization.

4. Process according to claim 1, wherein as organic material in the second step there is added a vinyl monomer which after absorption in the particles is polymerized with an oil-soluble initiator.

5. Process according to claim 4, wherein in the second step the oligomer-polymer particles prepared in the first step are swelled with an oil-soluble initiator having a very low solubility in water in a ratio by volume of initiator:particles of 10:1 to 200:1, and then vinyl monomer is added in a proportion by volume relative to the initiator of 30:1 to 1000:1, under conditions in which the initiator added in the second step is not transported out of the particles prepared in the first step, while the vinyl monomer diffuses into said particles, whereby polymerization of the monomer takes place inside the particles.

6. Process according to claim 3, wherein to facilitate the incorporation of the initiator having a very low solubility in water in the polymer og oligomer-polymer particles respectively, a dispersion of the initiator or a solution of the initiator is prepared and is added to the dispersion of the polymer and oligomer-polymer particles respectively.

7. Process according to claim 3, wherein in order to increase the rate and the capacity of swelling with an initiator having a very low solubility in water into the polymer particles in the first step and/or the oligomer-polymer particles in the second step, there is used a solvent for the initiator which is miscible with water and which is used in an amount of 5 to 200% based on the water in the system, for the incorporation of the initiator.

8. Process according to claim 1 for the preparation of monodisperse polymer particles, wherein in the first step for the preparation of oligomer-polymer-particles, monodisperse polymer particles are used.

9. Process according to claim 1, wherein oligomer particles are prepared in the first step by (1) dispersing an oil-soluble initiator or a solution thereof in an organic solvent together with water and emulsifier, (2) adding monomer in a molar ratio to the initiator of 0.25:1 to 50:1 and (3) effecting polymerization.

10. Process according to claim 1, wherein to the oligomer particles prepared according to claim 9 there is added an initiator having a very low solubility in water of $<10^{-3}$ g/l $H_2O$ which is allowed to swell the oligomer particles and which is added in a ratio by volume to the oligomer particles of 10:1 to 200:1, whereafter vinyl monomer is added in a ratio by volume to the initiator of 30:1 to 1000:1, whereby polymerization of the monomer takes place inside the particles.

* * * * *